Figures 1, 2, 3:
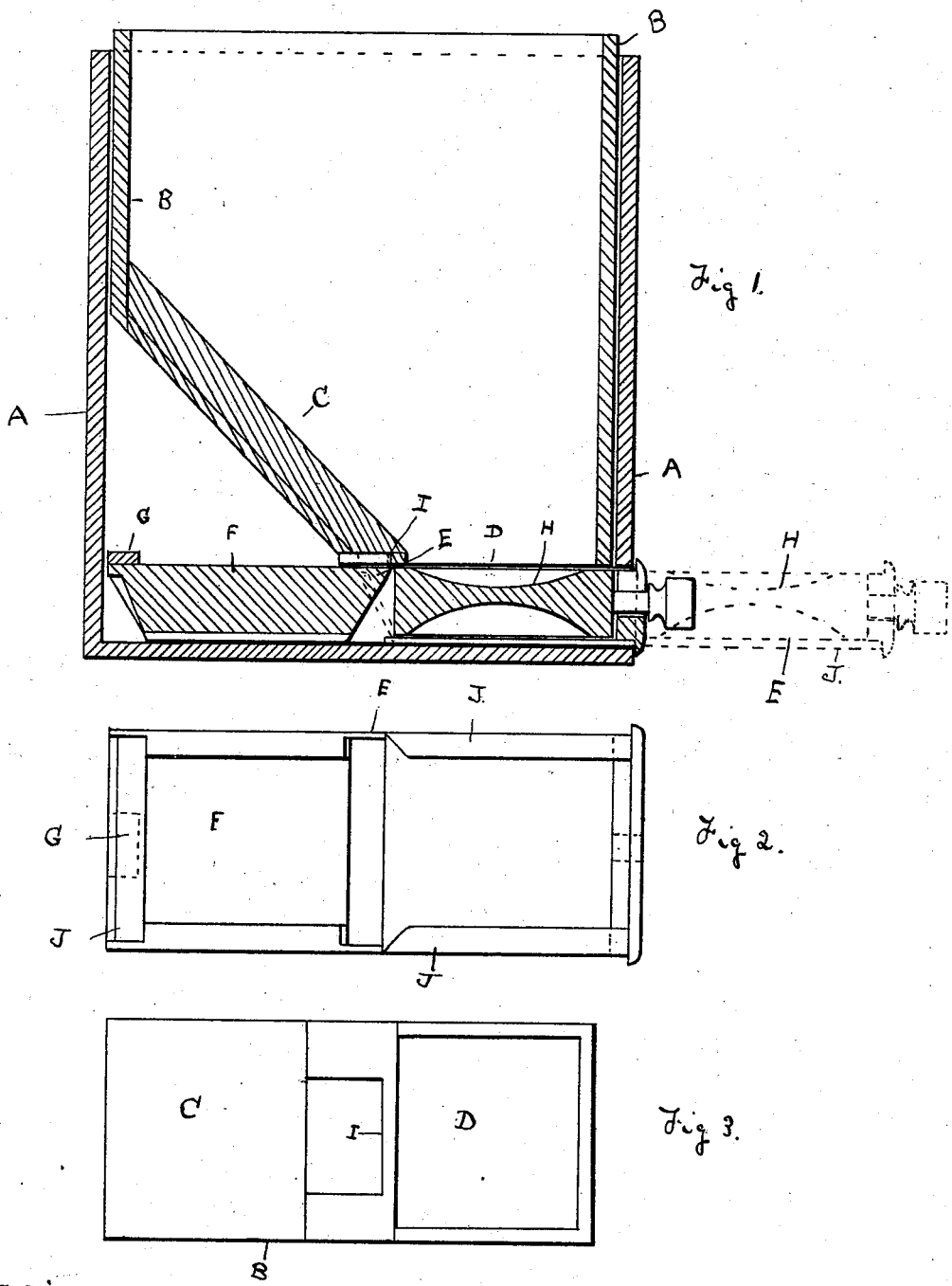

No. 702,083. Patented June 10, 1902.
A. R. & H. G. WORMWOOD.
MEASURING CASE.
(Application filed Nov. 4, 1901.)
(No Model.)

Witnesses.
Marion Richards.
Anna M. Cole.

Inventors.
Alfred R. Wormwood
Hannah G. Wormwood
by
Verrill Clifford.
Attorneys.

UNITED STATES PATENT OFFICE.

ALFRED R. WORMWOOD AND HANNAH G. WORMWOOD, OF PORTLAND, MAINE.

MEASURING-CASE.

SPECIFICATION forming part of Letters Patent No. 702,083, dated June 10, 1902.

Application filed November 4, 1901. Serial No. 81,052. (No model.)

*To all whom it may concern:*

Be it known that we, ALFRED R. WORMWOOD and HANNAH G. WORMWOOD, citizens of the United States, residing at Portland, in the county of Cumberland and State of Maine, have invented certain new and useful Improvements in Measuring-Cases; and we do hereby declare the following to be a full, clear, and exact description of the invention, such as will enable others skilled in the art to which it appertains to make and use the same.

Our invention relates to improvements in measuring-cases, and is especially designed for any finely ground or pulverized material, such as baking-powders, ground spices, and the like.

It consists of an outer casing, a removable inner casing with a hopper-shaped bottom, a drawer moving in the outer casing and below the inner casing, a removable measuring-receptacle in said drawer, and in certain other details of construction that will be hereinafter more fully set forth and described.

In the drawings herewith accompanying and forming a part of this application, Figure 1 is a vertical sectional view of our improved device, the dotted lines showing the drawer pulled out. Fig. 2 is a bottom plan view of the extensible drawer with the measuring-receptacle removed therefrom, and Fig. 3 is a bottom plan view of the inner case.

Same letters of reference refer to like parts in all the figures.

In said drawings, A represents an outer casing, which we have shown rectangular in outline, although the same may be made in a different form without materially departing from the spirit of our invention.

B represents an inner casing having a sloping bottom C and an opening D, said case being adapted to fit closely within the outer casing, being of substantially the same shape as the outer casing. Adapted to slide in the outer casing and near the bottom thereof is a drawer E, provided with a solid portion F and a removable portion H, said removable portion being hollowed out, so as to serve as a measure, said measuring-receptacle containing one or more measures of various sizes. We have shown in the drawings a removable measuring device containing but two different-sized measures; but we do not wish to limit ourselves to this exact form, for a greater number of measures could be employed without departing from the spirit of this invention.

The object of providing the slide with a solid portion F is to fill up the space in the bottom of the inner case when the drawer is drawn forward, and in order to prevent the drawer from being drawn outwardly too far, and thereby causing the contents to fall down into the bottom of the outer case, we provide the back part of the solid portion with a stop G, which is adapted when the drawer is pulled forward to engage the stop H on the lower portion of the inner case. Also to enable the drawer to be drawn out easily we provide tracks J, which bear on the bottom of the outer casing and serve to facilitate the movement of the drawer in and out.

The object of making the device in two parts—that is, containing an outer casing and an inner casing—is that the inner casing being allowed to move up and down a gravity-pressure is at all times exerted on the drawer, and therefore serves when the drawer is being pushed back to remove any of the pulverized or powdered materials that may have dropped on the solid portion and push them into the receptacle, thereby keeping the solid portion clean and at the same time preventing any particles from getting in between the casing and the slide and causing friction and litter thereby. It also further serves to make a tight fit of the slide and will naturally take up by gravity any wear that may come thereon by the frequent use of the device, and it further facilitates the cleaning of both cases when occasion requires.

The operation of our improved device is as follows: The cases are placed in position, as shown in Fig. 1 in the drawings, and the material to be measured, such as baking-powder or the like material, is then placed in the inner case. From the hopper-shaped bottom the material is thrown forwardly into the measuring device in the bottom. The drawer is then pulled outwardly, the measuring device being completely filled. When the drawer is pulled out, the solid portion fills up the space through which the material came, preventing the egress of any further matter. The measuring-receptacle is then removed and its contents placed where desired. The measuring-receptacle is then returned to its place and the drawer pushed back. The process can be repeated as many times as it is desired to use the device.

Our object in providing receptacles of different sizes is to afford an easy means of quickly and accurately measuring quantities of pulverized or powdered materials, and is of especial usefulness where quantities in odd proportions are required, it being understood that but one of the measures can be used at one time.

Having thus described our invention and its use, we claim—

1. In an article of the class described, in combination, an outer casing having an opening in one end and near the bottom thereof, a removable inner casing having an inclined bottom and opening therein, a drawer, one portion thereof being solid, the other portion being open for the reception of a removable measuring-receptacle, said inner casing adapted to rest upon the upper surface of said drawer.

2. In an article of the class described, in combination, a plurality of cases, one fitting within the other, the inner case having an inclined bottom and an opening therein, a drawer consisting of a closed and an open portion, the open portion carrying a removable measuring device with a plurality of divisions, said drawer moving in an opening in the outer casing and underneath the inner case, said inner case resting lightly on said drawer and stops on the under side of said inner casing and on the upper side of said drawer and at the rear thereof to limit the forward movement of said drawer.

3. In a device of the class described, in combination, an outer casing having an opening in the end and near the bottom, an inner casing removably mounted in said outer casing and provided with an inclined bottom and an opening therein, a sliding member consisting of closed and open portions, the open portion carrying a removable receptacle consisting of various-sized measuring devices, the inner casing adapted to rest lightly on said sliding member, the solid portion of said sliding member adapted to close the opening in the bottom of the inner casing when said member is in extended position and the measuring-receptacle to be in registry with the opening in said inner casing when said member is in its closed position.

In testimony whereof we affix our signatures, in presence of two witnesses, this 24th day of October, 1901.

ALFRED R. WORMWOOD.
HANNAH G. WORMWOOD.

In presence of—
NATHAN CLIFFORD,
ELGIN C. VERRILL.